United States Patent
Loken

(10) Patent No.: US 9,321,406 B2
(45) Date of Patent: Apr. 26, 2016

(54) COLLAPSIBLE BICYCLE RACK HAVING ADJUSTABLE FRONT WHEEL HOLDERS

(71) Applicant: Strahan Lingjerde Loken, Victoria (CA)

(72) Inventor: Strahan Lingjerde Loken, Victoria (CA)

(73) Assignee: Danik Industries Limited (CA)

( * ) Notice: Subject to any disclaimer, the term of this patent is extended or adjusted under 35 U.S.C. 154(b) by 575 days.

(21) Appl. No.: 13/692,056

(22) Filed: Dec. 3, 2012

(65) Prior Publication Data

US 2014/0151421 A1 Jun. 5, 2014

(51) Int. Cl.
*B60R 9/06* (2006.01)
*B60R 9/10* (2006.01)

(52) U.S. Cl.
CPC .... *B60R 9/06* (2013.01); *B60R 9/10* (2013.01)

(58) Field of Classification Search
CPC ............ B60R 9/06; B60R 9/10; B60R 9/045; B25H 1/0014; B60P 3/077; B60P 3/075; B60P 3/07; Y10S 224/924; B62H 3/06
USPC .............. 224/497, 502, 549, 42.34, 508, 504, 224/924, 519–521, 402–405, 537, 571, 455, 224/925, 42.12, 42.26, 42.27, 42.3, 42.29, 224/42.28, 42.18, 42.19, 42.16, 224/42.13–42.15, 568, 460, 534; 211/17–22, 5, 96, 99, 100; 403/65; 248/499

See application file for complete search history.

(56) References Cited

U.S. PATENT DOCUMENTS

| | | | | |
|---|---|---|---|---|
| 3,374,899 A | * | 3/1968 | Bator | 211/96 |
| 5,373,978 A | * | 12/1994 | Buttchen et al. | 224/510 |
| 2007/0057001 A1 | * | 3/2007 | Wang | 224/536 |
| 2012/0125965 A1 | * | 5/2012 | Castro | 224/534 |

* cited by examiner

*Primary Examiner* — Adam Waggenspack
*Assistant Examiner* — Matthew Theis
(74) *Attorney, Agent, or Firm* — Morland C. Fischer

(57) ABSTRACT

A collapsible bicycle rack to be transported at the rear of a motor vehicle for carrying bicycles that are aligned vertically with their front wheels facing up. The bicycle rack includes an upper front wheel support having stationary front wheel holders and oppositely-aligned adjustable front wheel holders that can be moved relative to the stationary front wheel holders to vary the distance therebetween in order to support the front wheels of bicycles having different diameters. The bicycle rack also includes a lower rear wheel support that rotates simultaneously with the upper front wheel support between an unfolded deployed configuration extending outwardly from an upstanding main support bar and a collapsed compact configuration lying adjacent the upstanding main support bar.

12 Claims, 15 Drawing Sheets

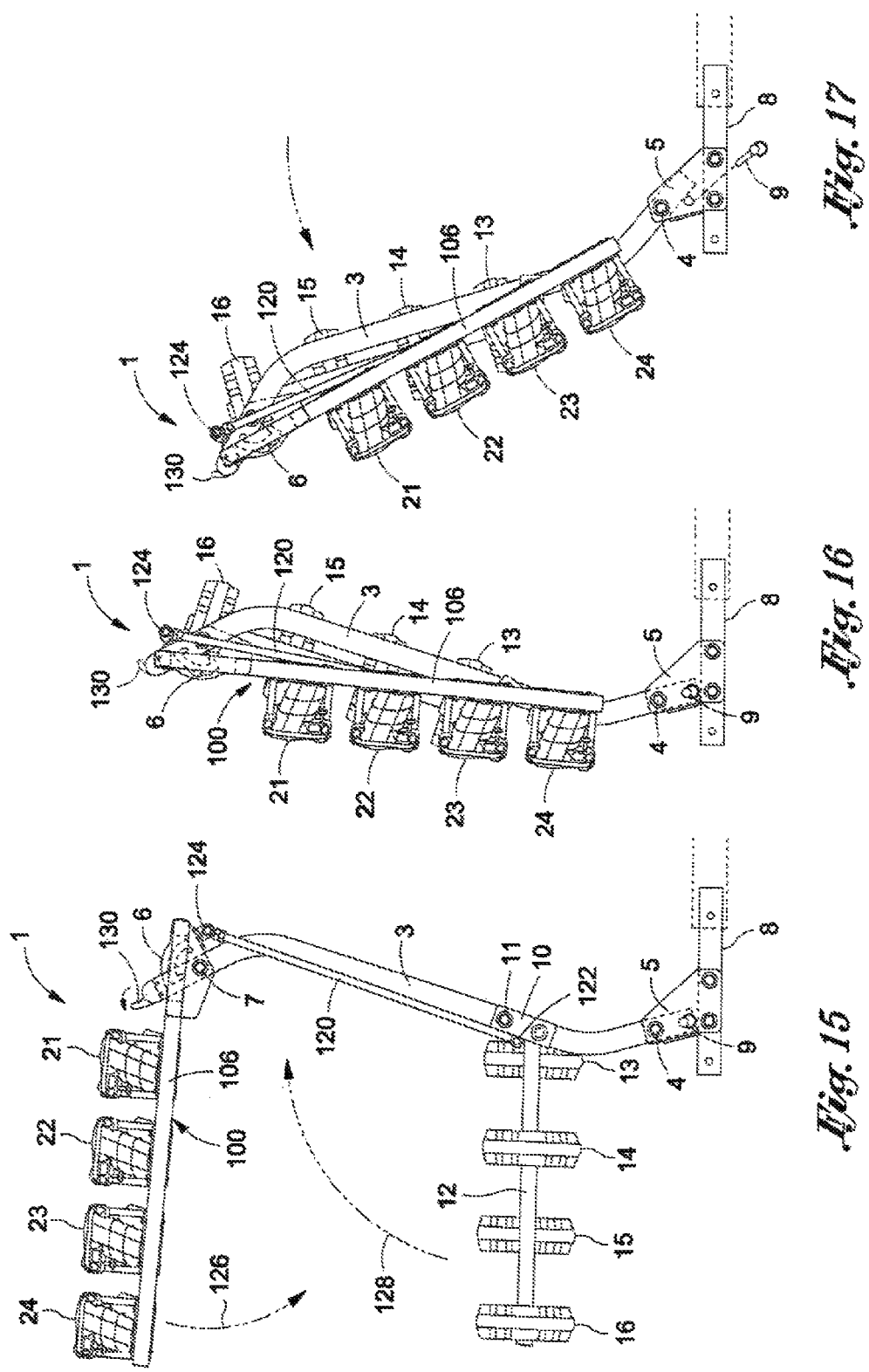

COLLAPSIBLE BICYCLE RACK HAVING ADJUSTABLE FRONT WHEEL HOLDERS

BACKGROUND OF THE INVENTION

1. Field of the Invention

This invention relates to a collapsible bicycle rack to be transported at the rear of a motor vehicle for carrying bicycles that are all aligned vertically so that their front wheels face up. The bicycle rack includes rear wheel holders and opposing pairs of adjustable and stationary front wheel holders that cart be selectively positioned relative to one another to receive and support front wheels having different diameters.

2. Background Art

It is well known to connect a bicycle rack to a hitch at the rear of a motor vehicle so that one or more bicycles can be transported by the vehicle. In many racks, two or more bicycles are earned side-by-side in horizontal alignment. Such an alignment consumes a relatively large amount of space to create overhang at the rear of the vehicle and prevent the bicycles from being nested close together. In some cases, the bicycle rack engages the fork crown of the bicycle. Because of the size and location of the fork crown, such bicycle rack is limited to carrying only certain types of bicycles. In other cases, a series of time-consuming and often cumbersome manipulations must be made in order to first attach a bicycle to and later detach the bicycle from the rack. In still other cases, when no bicycles are being carried by the bicycle rack, there is no easy way to collapse the rack into a compact and more space-efficient configuration without having to remove the rack altogether from the vehicle.

An example of a collapsible bicycle rack which overcomes the aforementioned problems is available by referring to my patent application Ser. No. 13/556,952 filed Jul. 24, 2012. A bicycle rack is disclosed having front and rear wheel holders that enable pairs of bicycles to be earned vertically and upside down relative to one another so that their front wheels face up. The bicycle rack is adapted to be collapsed from an unfolded deployed configuration when bicycles are being transported to a compact folded configuration when no bicycles are being transported.

Despite the foregoing improvements, not all bicycles have wheels of identical size. In particular, not every bicycle rack is capable of being easily adjusted in order to carry a variety of different bicycles made by different manufacturers located in different countries with correspondingly different wheel diameters. Consequently, the application and practicality of such a bicycle rack is undesirably limited, especially in cases where different bicycles are being transported at the same time.

SUMMARY OF THE INVENTION

In general terms, a bicycle rack is disclosed by which a plurality of (e.g., four) bicycles can be carried in vertical alignment at the rear of a motor vehicle. When no bicycles are being carried, the bicycle rack is adapted to be collapsed from an unfolded deployed configuration to a compact folded configuration without having to be removed from the vehicle.

According to a preferred embodiment, the bicycle rack includes an upstanding main support bar which extends vertically from a main gusset. The main support bar is coupled to the hitch at the rear of a motor vehicle by way of a receiver bar. When a pull pin which runs through the main gusset and the main support bar is removed, the main support bar can he rotated at a pivot so as to tilt away from the vehicle to facilitate the bicycle rack being uncoupled from the hitch. A lower rear wheel support arm extends horizontally from a rotatable lower linking arm support gusset that is pivotally attached to the main support bar. The lower rear wheel support arm is rotatable upwardly with the lower linking arm support gusset from its horizontal position extending outwardly from the main support bar to a vertical position adjacent the main support bar. A first pair of rear wheel holders at one side of the rear wheel support arm face in one direction, and a second pair of rear wheel holders at the opposite side of the rear wheel support arm face in an opposite direction. The positions of the first pair of rear wheel holders along the lower rear wheel support arm are staggered relative to the position of the second pair of rear wheel holders.

A horizontally-extending U-shaped upper front wheel support is pivotally connected to the top of the main support bar by means of an upper linking arm support gusset. A linking arm extends between the upper and lower linking arm support gussets. When an upward pulling force is exerted upon a cam release handle at the top of the main support bar the upper front wheel support is rotatable downwardly with the upper linking arm support gusset from its horizontal position extending outwardly from the main support bar to a vertical position adjacent the main support arm. The downward rotation of the upper front wheel support is imparted to the lower linking arm support gusset by way of the linking arm to cause the simultaneous upward rotation of the lower rear wheel support by which to achieve the compact folded configuration of the bicycle rack. A first set of front wheel holders is attached to a first side bar of the U-shaped upper front wheel support. A second set of front wheel holders is attached to an opposite side bar of the front wheel support so as to face the first set of front wheel holders in opposing alignment therewith. Alternating ones of the first and second sets of front wheel holders attached to the first and second side bars are stationary, and alternating other ones of the first and second sets of front wheel holders are adjustable and movable towards or away from the oppositely-aligned stationary front wheel holders depending upon the diameters of the front wheels of the bicycles to be transported by the bicycle rack. Each opposing pair of stationary and adjustable front wheel holders engages and supports the front wheel of one bicycle at two different points around the circumference of the wheel.

Each stationary front wheel holder includes a tire basket within which to receive and engage the front wheel of a bicycle at a first point. Each stationary front wheel holder is coupled to one of the first or second side bars of the U-shaped upper front wheel support by means of a first mounting bracket. A pair of tire basket retention rods runs through respective position retention channels that are mounted at opposite sides of the tire basket to connect the stationary front wheel holder to the mounting bracket.

Each oppositely-aligned adjustable front wheel holder also includes a tire basket within which to receive and engage the front wheel at a second point. The adjustable front wheel holder is coupled to the opposite one of the first or second side bars of the upper front wheel support by means of a second mounting bracket. A pair of tire basket adjustment rods runs through respective position adjustment channels that are mounted at opposite sides of the tire basket to connect the adjustable front wheel holder to the second mounting bracket. The position adjustment channels ride over and along the tire basket adjustment rods until the tire basket of the adjustable front wheel holder is initially positioned relative to the tire basket of the opposing stationary front wheel holder so as to be able to engage and support the front wheel of the bicycle. A spring actuated position locking barrel is biased into locking engagement with one of a series of tire adjustment depressions formed in one of the pair of tire basket adjustment rods to prevent a displacement of the position adjustment channels over the pair of tire basket adjustment rods to thereby prevent any further relocation of the tire basket.

Should it become necessary to reposition the tire basket of the adjustable front wheel holder relative to the tire basket of the opposing stationary front wheel holder, an upward pushing force is applied to the spring actuated position locking barrel by way of a plunger. Accordingly, the locking barrel is moved out of its engagement with the tire adjustment depression so that the position adjustment channels are once again able to ride over the pair of tire basket adjustment rods in order to relocate the tire basket. Once the tire basket has been, repositioned as necessary to receive the front wheel of a bicycle, the pushing force is terminated, and the spring actuated locking barrel, is automatically pulled downwardly and back into its locking engagement with a different one of the series of tire adjustment depressions to hold the position adjustment channels and the tire basket of the adjustable front wheel holder in place.

Each bicycle is suspended vertically (i.e., with its front wheel facing up) in parallel alignment with the center line of the vehicle by means of the receipt of the front wheels of the bicycles by opposing pairs of stationary and adjustable front wheel holders from the upper front wheel support and by means of the receipt of the rear wheels of the bicycles by respective ones of the rear wheel holders from the lower rear wheel support arm. Each pair of adjacent bicycles is carried upside down relative to one another so that their front wheels overlap and are angled (i.e., turned) relative to the back wheels. The oppositely-aligned stationary and adjustable front wheel holders are spaced above and outwardly from the first and second side bars of the upper front wheel support so that the bicycle rack is adapted to transport a variety of different bicycles including road bikes.

BRIEF DESCRIPTION OF THE DRAWINGS

FIG. 15 shows the directions in which the upper front wheel support and a lower rear wheel support arm of the bicycle rack of FIGS. 1 and 2 are simultaneously rotated from the unfolded deployed configuration of the rack to a compact folded configuration;

FIG. 16 shows the bicycle rack of FIG. 15 after it has been rotated to its compact folded configuration;

FIG. 17 shows the upstanding main support bar being tilted after the bicycle rack of FIG. 15 has first been rotated to its compact folded configuration of FIG. 16;

DESCRIPTION OF THE PREFERRED EMBODIMENT

Figure 1:
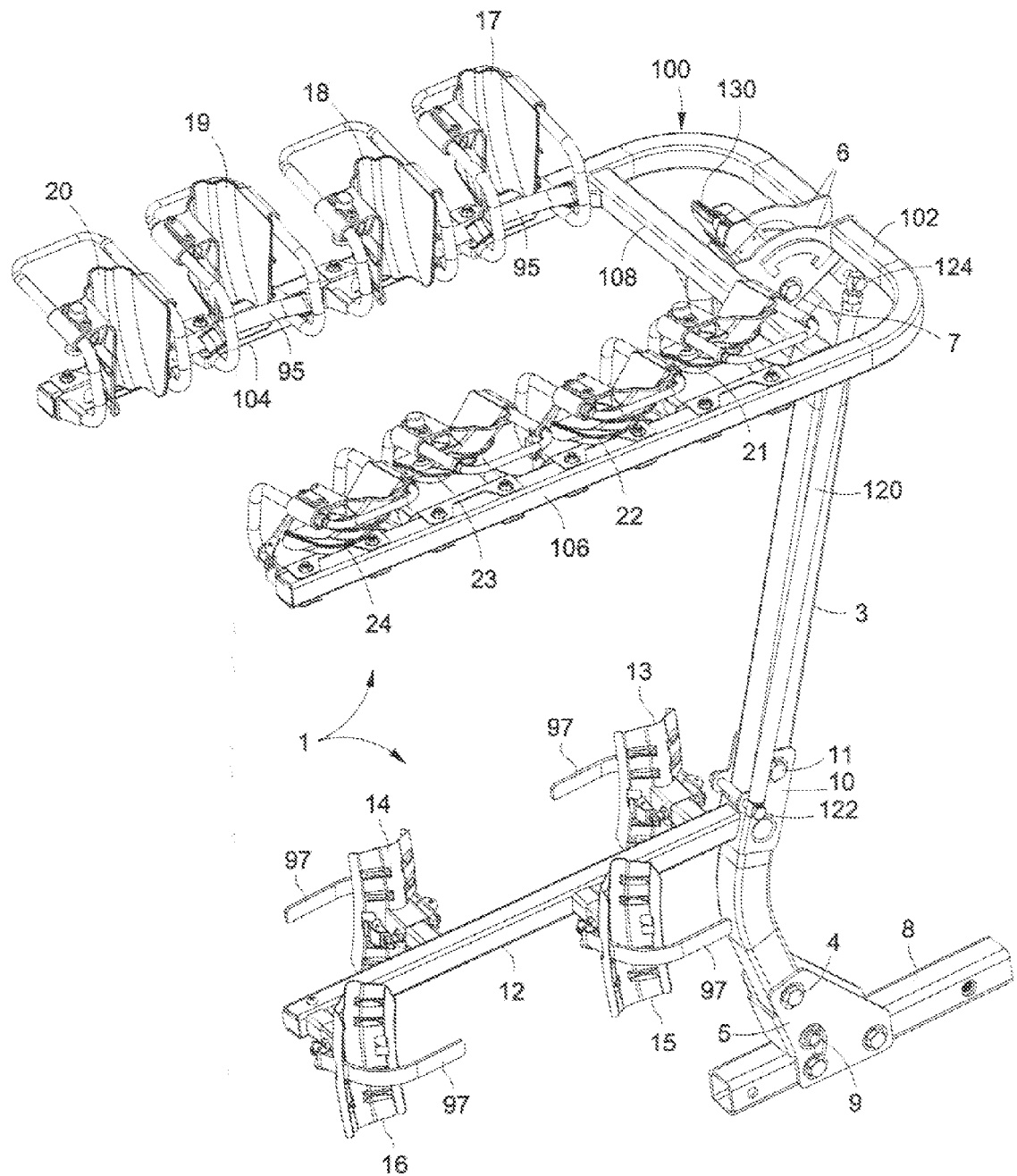
FIG. 1 is a perspective view of a collapsible bicycle rack according to a preferred embodiment of this invention with the bicycle rack being locked in an. unfolded deployed configuration and having front and rear wheel holders so that four bicycles can be transported.
Figure 2:
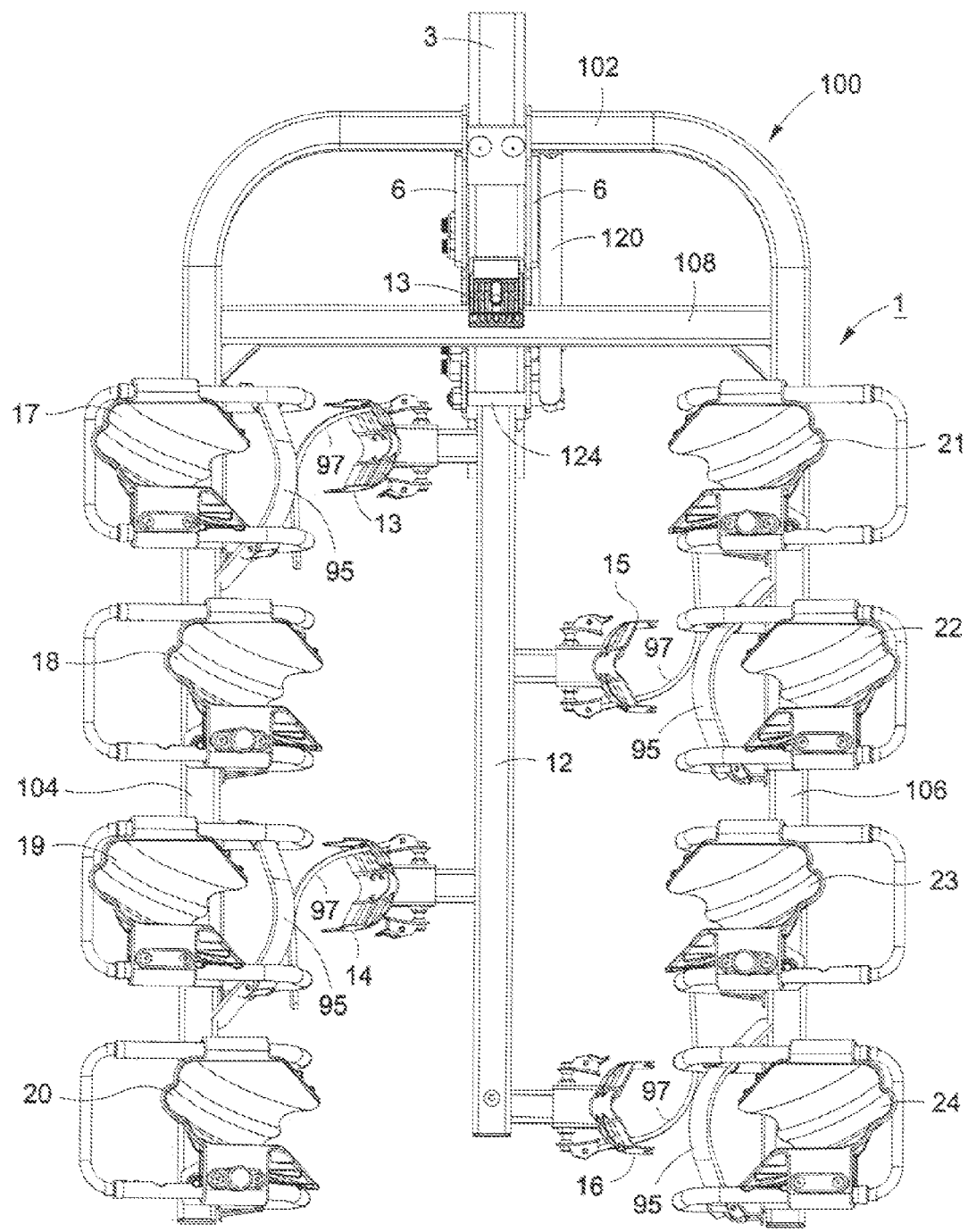
FIG. 2 is a top view of the collapsible bicycle rack of FIG. 1.

A preferred embodiment tor a collapsible bicycle rack 1 by which a plurality of (e.g., tour) bicycles can be carried in spaced vertical alignment with one another at the rear of a motor vehicle is now described while referring initially to FIGS. 1 and 2 of the drawings. To conserve space when no bicycles are being transported, the bicycle rack 1 is adapted to be collapsed from an unfolded deployed configuration as shown in FIG. 15 to a compact folded configuration as shown in FIG. 16 so as to lay close to the rear of the vehicle with which the rack is associated.

The collapsible bicycle rack 1 has a vertically-upstanding main support bar 3 which runs from a connection at the bottom thereof with a main gusset 5 to a connection at the top thereof with a rotatable upper linking arm support gusset 6. The bottom of the main support bar 3 is rotatably coupled to the main gusset 5 at a pivot 4. The upper linking arm support gusset 6 is pivotally connected to the top of the main support bar 3 by means of a pivot 7 (best shown in FIG. 14). Also connected to the main gusset 5 and extending rearwardly therefrom in substantially perpendicular alignment with the upstanding main support bar 3 is a receiver bar 8. The receiver bar 8 is sized and shaped so as to be detachably connected to a standard hitch at the rear of a motor vehicle (best shown in FIG. 18) to enable the bicycle rack 1 to he transported by the vehicle. A pull-pin 9 is removably received through each of the main gusset 5 and the upstanding main support bar 3. When the pull-pin 9 is removed, the main support bar 3 can rotate around pivot 4 so as to tilt away from the rear of the motor vehicle to facilitate the attachment and removal of the bicycle rack 1 from the hitch (best shown in FIG. 17).

A rotatable lower linking arm support gusset 10 is pivotally connected by means of a pivot 11 so as to lie in partial surrounding engagement with the main support, bar 3 at a location between the main gusset 5 and the upper linking arm support gusset 6. With the bicycle rack 1 connected to the hitch as shown in FIG. 15, the main support bar 3 bends towards the rear of the vehicle between the upper and lower linking arm support gussets 6 and 10. A lower rear wheel support arm 12 is connected to and extends horizontally outward from the lower linking arm support gusset 10, such that the support arm 12 is held in generally perpendicular alignment with the vertical main support bar 3. As is best shown in FIGS. 1 and 2, a first pair of generally U-shaped rear wheel holders 13 and 14 lies at one side of the rear wheel support arm 12. Lying at the opposite side of the rear wheel support arm 12 is a second pair of generally U-shaped rear wheel holders 15 and 16.

The first pair of rear wheel holders 13 and 14 face away from and lie in alternating alignment with respect to the second pair of rear wheel holders 15 and 16. That is to say, the U-shaped rear wheel holders 13 and 14 at one side of support arm 12 face in one direction, and the U-shaped rear wheel holders 15 and 16 at the opposite side of support arm 12 face in the opposite direction. What is more, the positions of the first pair of rear wheel holders 13 and 14 are offset (i.e., staggered) relative to the positions of the second pair of rear wheel holders 15 and 16. Therefore, the rear wheel holder 13 at one side of the support arm 12 is held closest to the main support bar 3, while the rear wheel holder 16 at the opposite side of support arm 12 is the furthest away from bar 3.

Each of the U-shaped rear wheel holders 13-16 is sized and shaped to receive therewithal and retain the rear wheel of one bicycle to be carried by the bicycle rack 1 herein disclosed. Inasmuch as a total, of tour rear wheel holders 13-16 are shown attached to the lower rear wheel support arm 12, a maximum of four bicycles may be carried by the bicycle rack 1. Nevertheless, it is to be expressly understood that a modified bicycle rack 1-1 of FIG. 3 can include more or less than four rear wheel holders in eases where a different number of bicycles will be transported. In any case, it is preferable that the modified bicycle rack 1-1 have at least two rear wheel holders (designated 13-1 and 15-1 in FIG. 3) facing in opposite directions so that at least two bicycles can be carried at the rear of a vehicle, A U-shaped upper front wheel support 100 is pivotally connected to the top of the main support bar 3 of the bicycle rack 1 of FIGS. 1 and 2 by means of the upper linking arm support gusset 6 (best shown in FIG. 14). The upper front wheel support 100 extends outwardly and substantially horizontally from the top of the vertical support bar 3 in a direction away from the motor vehicle. The front wheel support 100 is spaced above the lower rear wheel support arm 12 and includes a rear end 102 that is affixed to die gusset 6, a pair of spaced, parallel-aligned side bars 104 and 106 which depend from the rear end 102, and a cross bar 108 which extends between the side bars 104 and 106 to provide structural reinforcement. The side bars 104 and 106 of the front wheel support 100 are co-extensive to the rear end 102, such that the side bars 104 and 106 are held in spaced substantially parallel alignment with each other and with the lower rear wheel support arm 12. As will be explained when referring to FIG. 14, the upper linking arm support gusset 6 and the upper front wheel support 100 are rotated together at the pivot 7 relative to the main support 3.

As shown in FIGS. 1 and 2, a first set of (e.g., four) generally U-shaped front wheel holders 17, 18, 19 and 20 is attached to and evenly spaced from one another along a first 104 of the pair of side bars 104 and 106 of the upper front wheel support 100. A second set of (e.g., four) generally U-shaped front wheel holders 21, 22, 23 and 24 is attached to and evenly spaced from one another along the other one 106 of the pair of side bars of the front wheel support 100. The sets of front wheel holders 17-20 and 21-24 are attached to respective side bars 104 and 106 by means of brackets (designated 34 and 81 in FIGS. 4-13) such that the first set of U-shaped front wheel holders 17-20 and the second set of U-shaped front wheel holders 21-24 face one another.

The U-shaped front wheel holders 17-24 are sized and shaped to receive therewithin and retain therebetween the front wheels of the bicycles to he transported by the bicycle rack 1. Each opposing pair of front wheel holders 17 and 21, 18 and 22, 19 and 23, and 20 and 24 which faces one another is separated so as to be able to engage the front wheel of one bicycle at two different points around the circumference of the wheel. As previously explained, since the bicycle rack 1 of FIGS. 1 and 2 has first and second sets of four front wheel holders 17-20 and 21-24 (corresponding to the four rear wheel holders 13-16), a maximum of four bicycles can be carried by the bicycle rack). However, by changing the number of front wheel holders (e.g., designated 17-1, 18-1 and 21-1, 22-1 for die modified bicycle rack 1-1 shown in FIG. 3), more or less than lour bicycles can be carried.

As an important detail of this invention, the first set of front wheel holders 17-20 and the second set of front wheel holders 21-24 are attached to the upper front wheel support 100 so as to be spaced above and lie outside the pair of side bars 104 and 106 (best shown in FIG. 2) so as to provide sufficient clearance to accommodate road bikes. That is to say, because there is typically a small clearance between the tires and the down tube of a road bike, the adjustable nature and location of the opposing pairs of front wheel holders 17 and 21, 18 and 22, 19 and 23, and 20 and 24 relative to the side bars 104 and 106 of the front wheel support 100 as just described enables such road bikes to be conveniently coupled to and transported by the bicycle rack 1.

Figure 3:
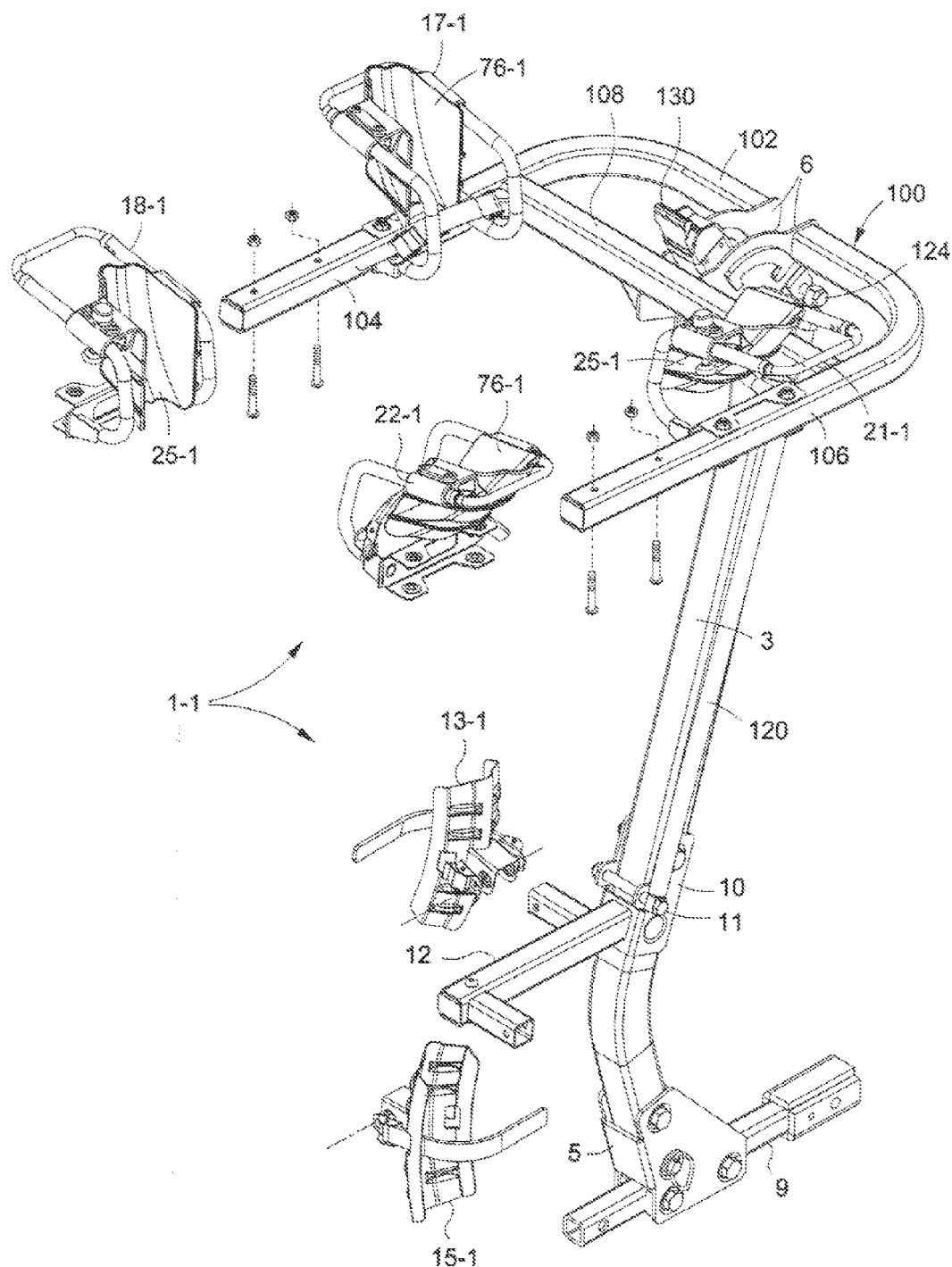
FIG. 3 is an exploded view of a modified bicycle rack including front and rear wheel holders so that two bicycles can be transported.

As will be explained in greater detail while referring to FIGS. 18-21, the bicycles being carried by the bicycle rack 1 or 1-1 of FIGS. 1-3 are supported and retained at the points of contact between the rear and front wheel holders 13-16 and 17-24 and the rear and front wheels of the bicycle. That is, the rear wheel of one bicycle will be supported by one of die rear wheel holders 13-16 of the lower rear wheel support arm 12, and the front wheel of the bicycle will be supported between a pair of opposing front wheel holders 17 and 21, 18 and 22, 19 and 23, or 20 and 24 at the side bars 104 and 106 of the upper front wheel support 100.

As another important detail of this invention, the space (i.e., distance) between each opposing pair of the front wheel holders 17 and 21, 18 and 22, 19 and 23, and 20 and 24 can be selectively adjusted to accommodate front wheels of different size such that the bicycle rack is adapted to carry different bicycles from different manufacturers. More particularly, alternating ones of the first set of front wheel holders 18 and 20 connected to the side bar 104 of the front wheel support 100 are adjustable relative to opposing ones of the second set of front wheel holders 22 and 24 which remain stationary at the side bar 106. In this same regard, alternating ones of the second set of front wheel holders 21 and 23 connected to the side bat 106 of the front wheel support 100 are adjustable relative to opposing ones of the first set of front wheel holders 17 and 19 which remain stationary at the side bar 104. Hence, the size of die wheels to be received by the front and rear wheel holders will not be limited by the dimensions of the bicycle rack. The details of one of the identical adjustable front wheel holders (e.g., 20) wilt be provided when referring hereinafter to FIGS. 4-8, and the details of one of the identical and oppositely-aligned stationary front wheel holders (e.g., 24) will be provided when referring to FIGS. 9-13.

A linking arm 120 which runs along one side of the vertical main support bar 3 is pivotally connected at the bottom thereof to a first pivot pin 122 that is coupled to the rotatable lower linking arm support gusset 10. The top of the linking arm 120 is pivotally connected to a second pivot pin 124 that is coupled to the rotatable upper linking arm support gusset 6. By virtue of the linking arm 120, the bicycle rack 1 can be collapsed front its unfolded deployed configuration (of FIG. 15) to its compact folded configuration (of FIG. 16) by causing the upper front wheel support 100 to rotate downwardly (in the direction of the reference arrow 126 of FIG. 15) towards the vertical main support bar 3 and the lower rear wheel support arm 12 to simultaneously rotate upwardly (in the direction of the reference arrow 128 of FIG. 15) towards the support bar 3.

Referring now to FIGS. 4-8 of the drawings, details are provided of the adjustable front wheel holders 18, 20, 21 and 23 that are connected to the side bars 104 and 106 of the U-shaped tipper front wheel support 100 of the bicycle rack 1 shown in FIGS. 1 and 2. Since all of the adjustable front wheel holders are identical, details of only one adjustable front wheel holder 20 will be provided herein. As earlier indicated, and will be described in greater detail below, the adjustable front wheel holder 20 can be adjusted (i.e., repositioned) relative to its opposing stationary front wheel bolder (e.g., designated 24 in FIGS. 1 and 2) to correspondingly change the distance therebetween to enable the bicycle rack 1 to advantageously accommodate bicycles having front wheels of different size (i.e., diameter).

Each adjustable front wheel holder 20 includes a tire basket 25 that is sized and contoured to receive and support at one point around its circumference the front wheel of a bicycle to be carried vertically (i.e., with its front wheel facing up) by the bicycle rack 1 (best shown in FIGS. 18-21). First and second cylindrical tire basket adjustment channels 26 and 28 are mounted at opposite sides of the tire basket 25. A first tire basket adjustment rod 30 is slidably received through the first tire basket adjustment channel 26, and a second tire basket adjustment rod 32 is slidably received through the second tire basket adjustment channel 28. Each of the first and second tire basket, adjustment rods 30 and 32 is curved so as to extend between the adjustment channels 26 and 28 and a first wheel holder mourning bracket 34.

That is, the first and second tire basket adjustment rods 30 and 32 extend through the first and second basket adjustment channels 26 and 28. First ends of the first and second tire basket adjustment rods 30 and 32 are connected together by a U-shaped coupling tail 36. The opposite ends of the curved first and second tire basket adjustment rods 30 and 32 are received through respective locking holes 38 and 40 that are formed in the front of the wheel holder mounting bracket 34. A locking tab 42 and 44 is connected to each of the opposite ends of the tire basket adjustment rods 30 and 32. At the same time that the first and second tire basket adjustment rods 30 and 32 are received by the locking holes 38 and 40, the locking tabs 42 and 44 are pushed into receipt by first and second locking slots 46 and 48 formed in the front of the mounting bracket 34 adjacent the locking holes 38 and 40. The receipt of the first and second tire basket adjustment rods 30 and 32 by the locking holes 38 and 40 and the receipt of the locking tabs 42 and 44 by the locking slots 40 and 48 enable the tire basket adjustment rods 30 and 32 to be securely attached to the wheel holder mounting bracket 34.

As earlier explained, the adjustable front wheel holder 20 is secured to one of the side bars 104 of the upper front wheel support 100 of the bicycle rack 1 by means of the first wheel holder mounting bracket 34. Mounting bracket 34 has upper and lower pairs of mounting flanges 50 and 52 projecting therefrom. Upper and lower pairs of axially-aligned mounting holes 54 and 56 are correspondingly formed through the upper and lower pairs of mounting flanges 50 and 52. When the mounting bracket 34 is positioned in surrounding engagement with the side bar 104 of the upper front wheel support 100 (best shown in FIGS. 5, 6 and 8), a threaded locking bolt 58 is pushed through each axially-aligned pair of upper and lower mounting holes 54 and 56. A threaded fastener (e.g., a nut 60) is mated to the locking bolt 58 so that the tire basket 25 of the adjustable front wheel holder 20 is attached to and held above the side bar 104.

Figure 4:
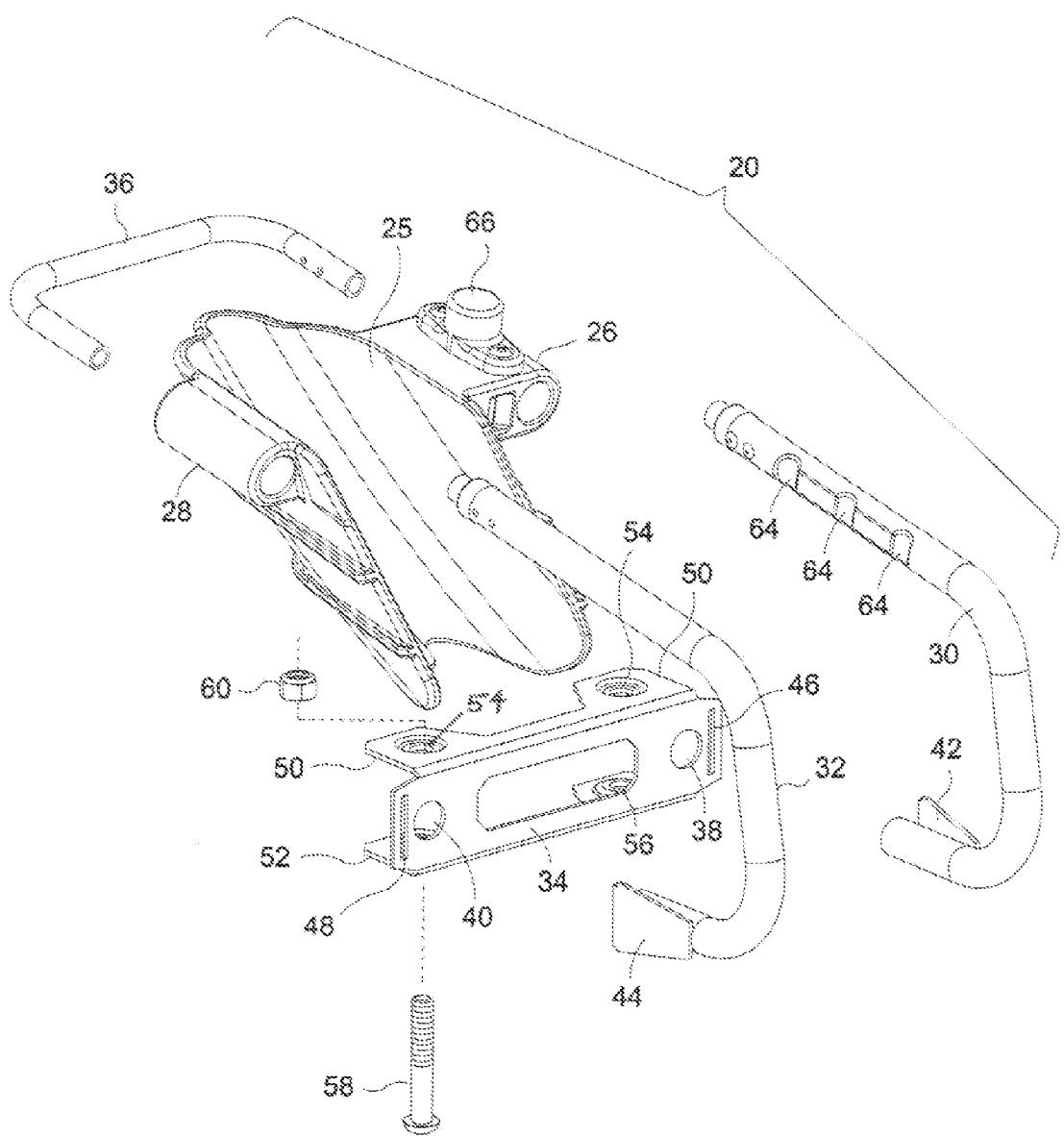
FIG. 4 is an exploded view of an adjustable front wheel holder of the bicycle rack of FIGS. 1 and 2 that is configured to engage and retain the front wheel of a bicycle at one point thereof.
Figure 5:
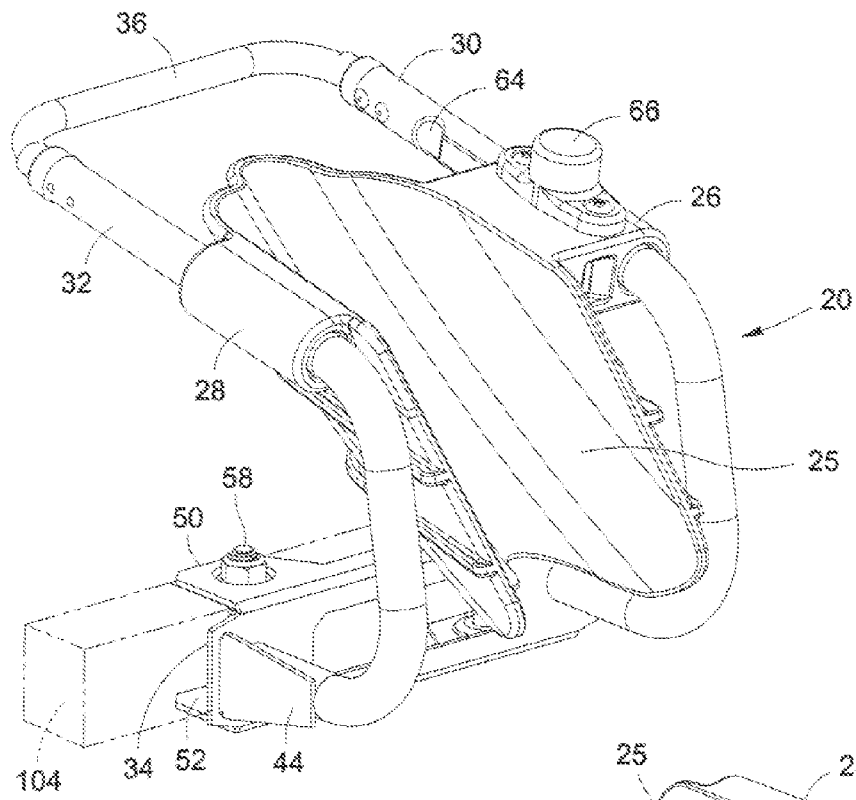
FIGS. 5 and 6 are front arid rear perspective views of the adjustable front wheel holder of FIG. 4.
Figure 6:
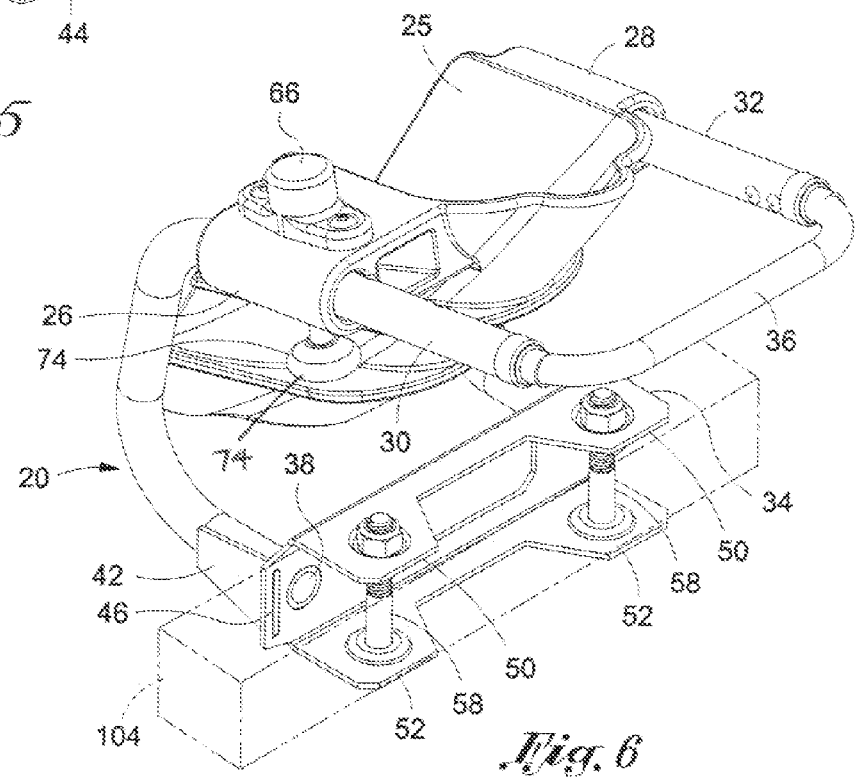
Figure 7:
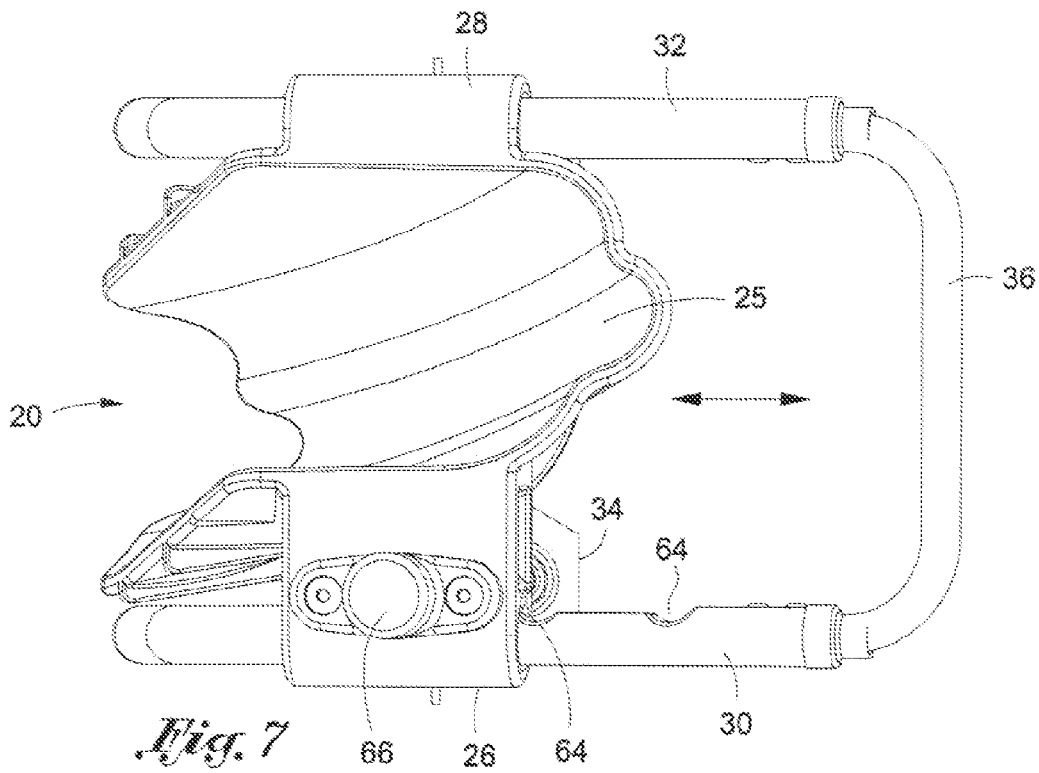
FIG. 7 is a top view of the adjustable front wheel holder of FIG. 4.
Figure 8:
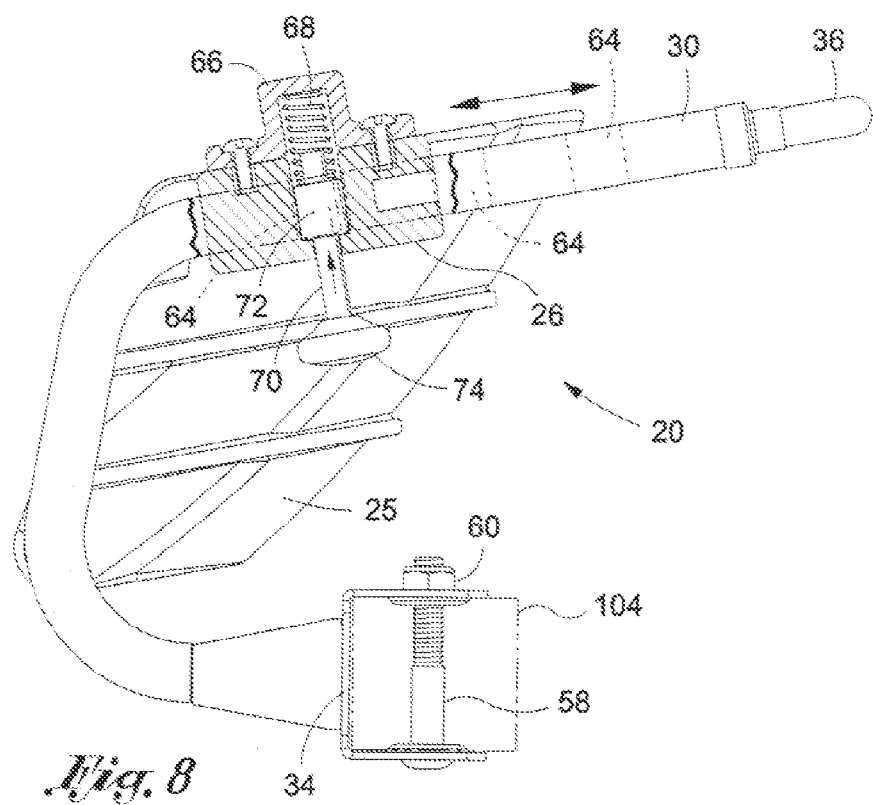
FIG. 8 is a side view, in partial cross section, of the adjustable front wheel holder of FIG. 4.

As an important feature of the adjustable front wheel holder 20 of FIGS. 4-8, a series of tire basket adjustment grooves or depressions 64 are formed along one side of the first tire basket adjustment rod 30 (best shown in FIG. 4). A spring housing 66 is affixed to the top of the first tire basket adjustment channel 26 at one side of the tire basket 25, As is best shown in FIG. 8, a (e.g., coil) spring 68 is enclosed by the spring housing 66.

The shall of a plunger 70 (of FIG. 8) has a relatively wide position locking barrel 72 that is located inside the tire basket adjustment channel 26 so as to communicate with the spring housing 66. One end of the spring 68 engages the spring housing 66, and the opposite end of the spring 68 engages the barrel 72. The barrel 72 is biased by the normally-expanded spring 68 into removable receipt by one of the series of tire basket adjustment depressions 64 formed along the side of the tire basket adjustment rod 30 that runs through tire basket adjustment channel 26. In other words, when the spring 68 is relaxed and expanded as shown in FIG. 8, the locking barrel 72 of the plunger 70 is pushed by the spring into a tire basket adjustment depression 64 so as to block the tire basket 25 (and the first and second tire adjustment channels 26 and 28 located at opposite sides thereof) from being displaced with respect to the first and second tire basket adjustment rods 30 and 32 which extend through channels 26 and 28 and are connected to one another by the coupling tail 36.

When it is desirable to reposition the tire basket 25 of the adjustable front wheel holder 20 to be able to accommodate a front bicycle wheel having a different diameter, an upward pushing force is applied to the head 74 of the plunger 70 of FIG. 8. The pushing force causes an upward movement of the position locking barrel 72 out of the tire basket adjustment depression 64 and into the spring housing 66 above the tire basket adjustment channel 26, whereby the spring 68 is compressed to store energy. When the barrel 72 is moved upwardly and out of the depression 64, the first and second tire basket adjustment channels 26 and 28 will be free to slide over and along the respective first and second tire basket adjustment rods 30 and 32 to cause a corresponding relocation of the tire basket 25.

More particularly, with the relatively wide locking barrel 72 pushed out of the tire basket adjustment channel 26 and into the spring housing 66, the relatively narrow shaft of the plunger 70 will be moved upwardly into the tire basket adjustment channel 26 so as to lie outside the tire basket adjustment depressions 64 formed along the side of the tire basket adjustment rod 30. Therefore, the tire basket adjustment channels 26 and 28 will no longer be blocked by the locking barrel 72 so as to now be able to ride over the tire basket adjustment rods 30 and 32 whereby the tire basket 25 will be carried forward or back depending upon whether the distance between the adjustable front wheel holder 20 and its opposing stationary front wheel holder (24 of FIGS. 1 and 2) is to be increased or decreased.

Once the position of the tire basket 25 of the adjustable front wheel holder 20 has been selected as just described, the upward pushing force being applied to the plunger head 74 is terminated. Accordingly, the previously-compressed spring 68 will now release its stored energy and expand within the spring housing 60. The expanding spring 68 automatically pushes the position locking barrel 72 of the plunger 70 downwardly, out of the spring housing 66 and back into the tire basket adjustment channel 26. The barrel 72 is received within a different one of the fire basket adjustment depressions 64 along the side of the tire basket adjustment rod 30. When the barrel 72 is received by the depression 64, any further relocation of the tire basket 25 and the tire basket adjustment channels 26 and 28 along the sides thereof will again be blocked with respect to the first and second tire basket adjustment rods 30 and 32.

FIGS. 9-13 of the drawings shows details of the stationary front wheel holders 17, 19, 22 and 24 that are connected to the side bars 104 and 106 of the U-shaped upper front wheel support 100 of the bicycle rack 1 shown in FIGS. 1 and 2. Since alt of the stationary front wheel holders are identical, details of only one stationary front wheel holder 24 will he provided. As was earlier explained, the stationary front wheel holder 24 lies opposite a corresponding adjustable front wheel holder (e.g., designated 20 in FIGS. 1 and 2). Moreover, the stationary front wheel holder 24 is attached to one of the side bars 106 of the upper front wheel support 100, such that the opposing adjustable front wheel holder 20 can be moved towards or away from the stationary front wheel holder to change the distance therebetween.

The stationary front wheel holder 24 includes a tire basket 76 that is sized and contoured to receive and support at a second point the same from wheel of the bicycle that is received and supported by the opposing adjustable front wheel holder 20. First and second cylindrical tire basket retention channels 77 and 78 are mounted at opposite sides of the tire basket 76. A first tire basket retention rod 79 is received through the first tire basket retention channel 77, and a second tire basket retention rod 80 is received through the second tire basket retention channel 78. Each of the first and second tire basket retention rods 79 and 80 is curved so as to extend between the retention channels 77 and 78 and a second wheel holder mounting bracket 81. Inasmuch as the second wheel holder mounting bracket 81 of FIGS. 9-13 is identical to the first wheel holder mounting bracket 34 of FIGS. 4-8, identical reference numerals will be used for each.

That is, the first and second tire basket retention rods 79 and 80 extend through the first and second tire basket retention channels 77 and 78. First ends of the first and second tire basket retention rods 79 and 80 are connected together by a U-shaped coupling tail 82. The opposite ends of the carved first and second tire basket retention rods 79 and 80 are received through respective locking holes 38 and 40 that are formed in the front of the wheel holder mounting bracket 81. A locking tab 83 is connected to each of the opposite ends of the tire basket retention rods 79 and 80. At the same time that the first and second tire basket retention rods 79 and 80 are received by the locking holes 38 and 40, the locking tabs 83 are pushed into receipt by first and second locking slots (only one of which 46 being visible in FIGS. 9 and 11) formed in the mounting bracket 81 adjacent locking holes 38 and 40. The receipt of the first and second tire basket retention rods 79 and 80 by the locking holes 38 and 40, and the receipt of the locking tabs 83 by the locking slots 46 enable the tire basket retention rods 79 and 80 to be securely attached to the wheel holder mounting bracket 81.

The mounting bracket 81 has upper and lower pairs of mounting flanges 50 and 52 projecting therefrom. Upper and lower pairs of axially-aligned mounting holes 54 and 56 are correspondingly formed through the upper and lower pairs of mounting flanges 50 and 52. When the mounting bracket 81 is positioned in surrounding engagement with the side bar 106 of the upper front wheel support 100, a threaded locking bolt 84 is pushed through each axially-aligned pair of upper and lower mounting holes 54 and 56. A threaded fastener (e.g., a nut 85) is mated to the locking bolt 84 so that the tire basket 76 of the stationary front wheel holder 24 is attached to and held above the side bar 106 so as to lie opposite the tire basket 25 of an adjustable front wheel holder 20.

Figure 9:
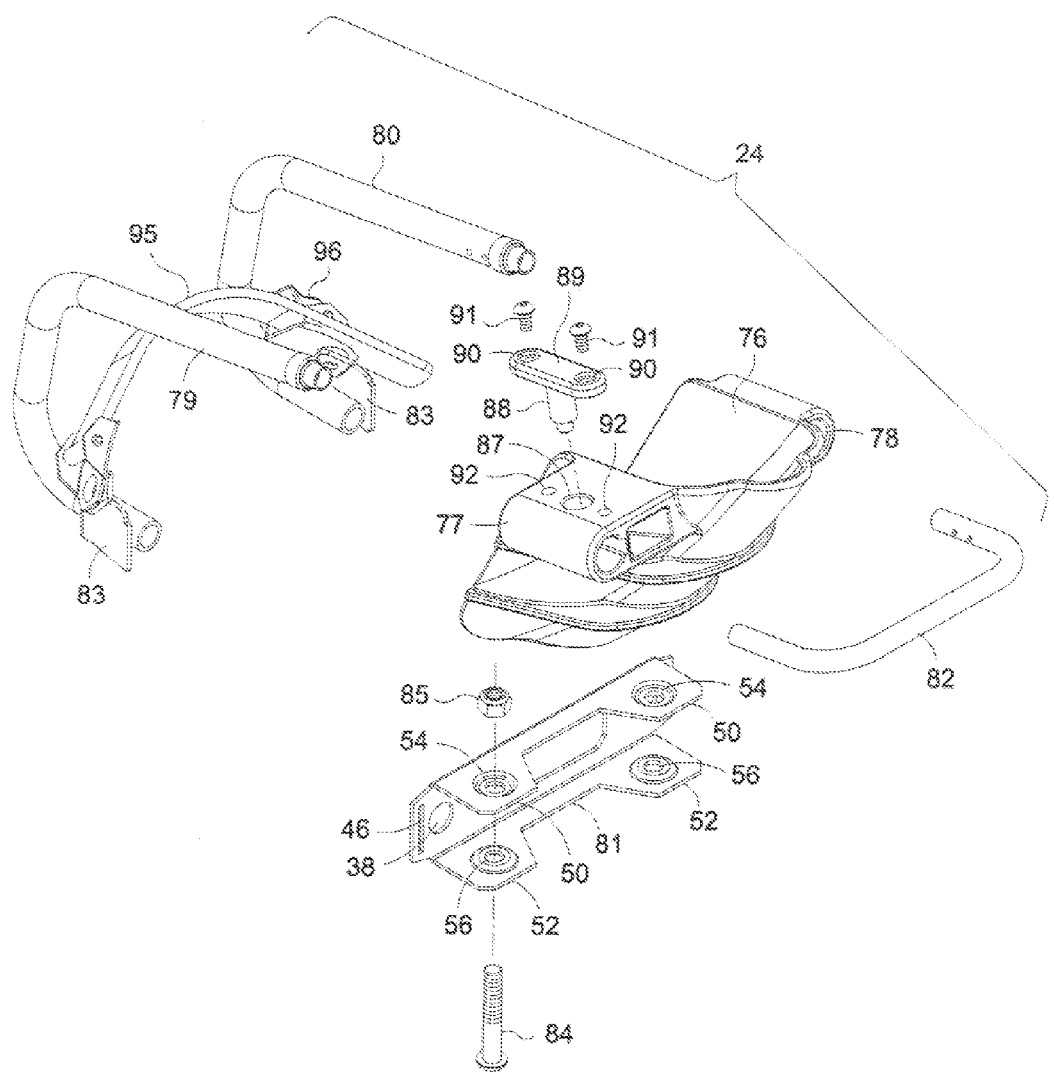
FIG. 9 is an exploded view of an opposing stationary front wheel holder of the bicycle rack of FIGS. 1 and 2 that is configured to engage and retain the front wheel of the bicycle at a different point thereof.
Figure 10:
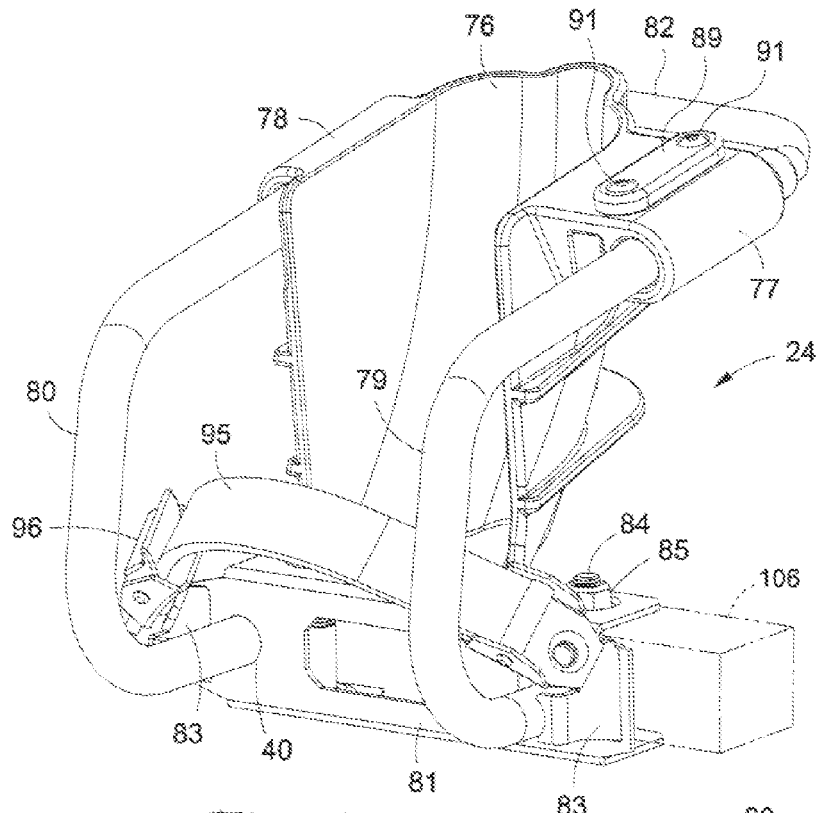
FIGS. 10 and 11 are front and rear perspective views of the stationary front wheel holder of FIG. 9.
Figure 11:
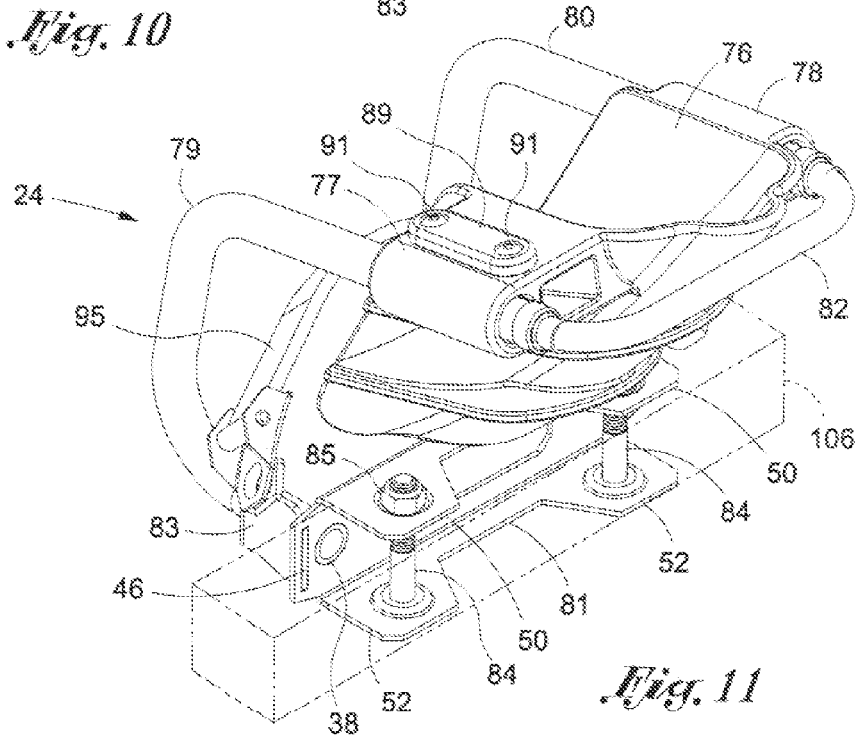

As is best shown in FIG. 9, a position retention hole 87 is formed through the top of the tire basket retention channel 77 that is located at one side of the tire basket 76. The position retention hole 87 is sized to receive a locking post 88 therethrough. The locking post 88 depends downwardly from a locking plate 89. A pair of mounting holes 90 are formed through the locking plate 89. Threaded fasteners (e.g., screws 91) run through the mounting holes 90 and into mating engagement with axially-aligned threaded holes 92 formed in the top of the tire basket retention channel 77 at opposite sides of the position retention hole 87, whereby the locking plate 89 can be connected atop the position retention channel 77, so that the locking post 88 is moved through the position retention hole 8 and into the position retention channel 77.

Figure 12:
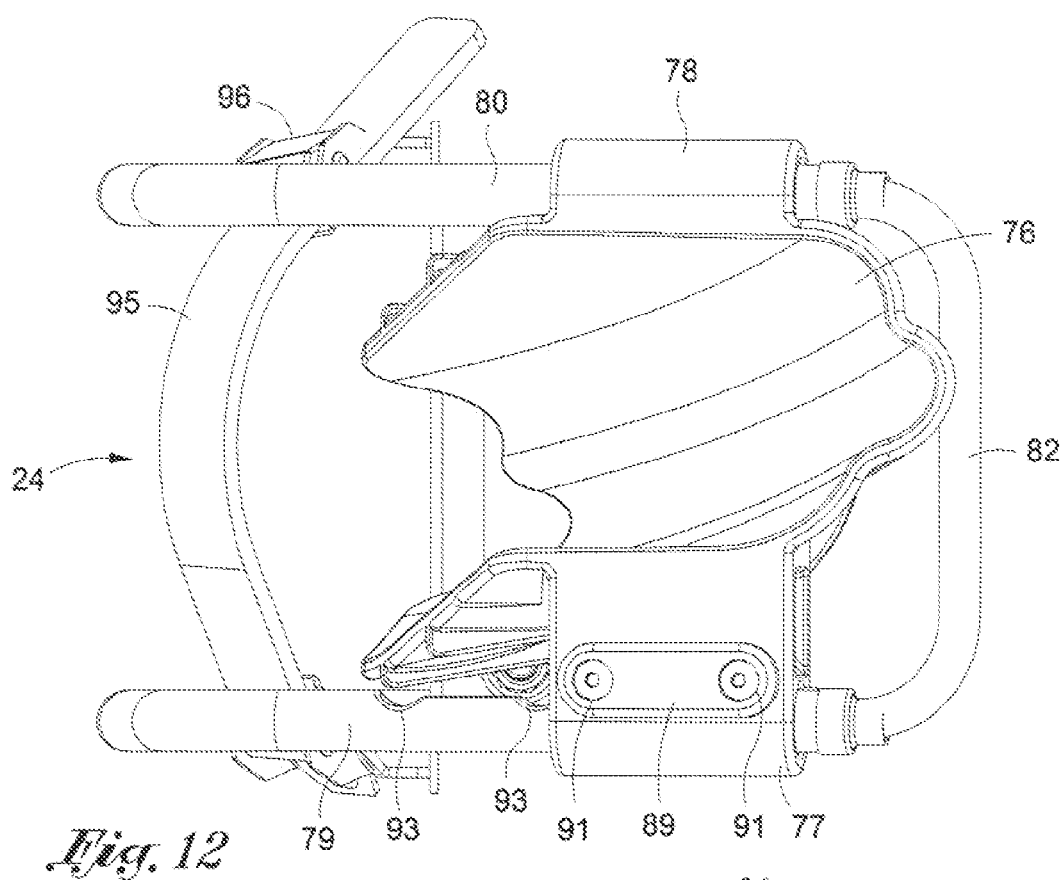
FIG. 12 is a top view of the stationary front wheel holder of FIG. 9.
Figure 13:
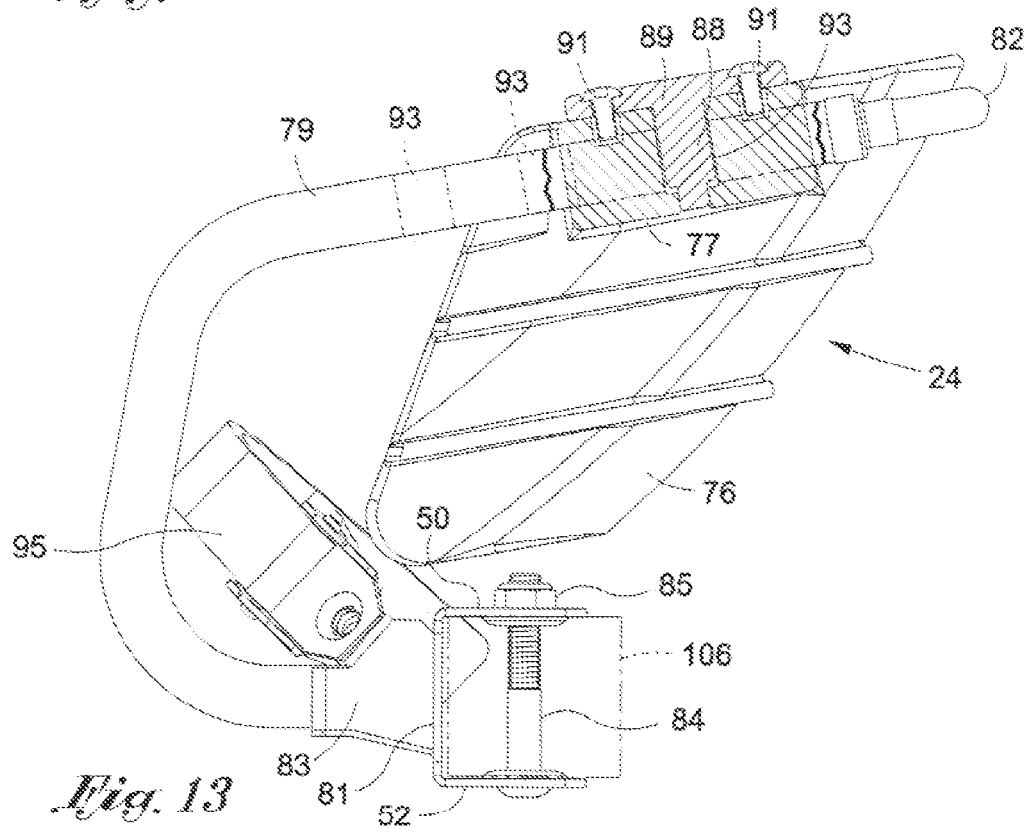
FIG. 13 is a side view, in partial cross section, of the stationary front wheel holder of FIG. 9.

A series of tire basket retention grooves or depressions 93 are formed along one side of the first tire basket retention rod 79 (best shown in FIGS. 12 and 13. Prior to moving the locking post 88 of the locking plate 89 into the position retention hole 87 in the top of the tire basket retention channel 77, the tire basket 76 of the stationary front wheel holder 24 is positioned relative to the tire basket 25 of the opposing adjustable front wheel holder 20 of FIGS. 4-8. That is, the tire basket 76 is pushed forward or back such that the tire basket retention channels 76 and 77 slide over and along respective ones of the first and second the basket retention rods 79 and 80.

Once the tire basket 76 is positioned as desired, the locking plate 89 is connected atop the tire basket retention channel 77, and the locking post 88 is moved into the retention channel 77 by way of the position retention hole 87. As is best shown in FIG. 13, with the locking plate 89 attached to the tire basket retention channel 77, the locking post 88 which depends therefrom is moved into engagement with one of the series of tire basket retention depressions 93 formed along the tire basket retention rod 79. The engagement of a depression 93 by the locking post 88 blocks the tire basket retention channels 77 and 78 from riding over the tire basket retention rods 79 and 80, whereby to hold the tire basket 76 of the stationary front wheel holder 24 in place. Therefore, any additional adjustment of the distance between the tire baskets 25 and 76 of the oppositely-aligned adjustable and stationary front wheel holders 20 and 24 is now accomplished by means of relocating the tire basket 25 of the adjustable front wheel holder 20 in the manner that was earlier described when referring to FIGS. 4-8.

Continuing to refer to FIGS. 9-12, a tie-down strap 95 is attached at one end thereof to one of the locking tabs 83 from one of the first and second tire basket retention rods 79. The opposite end of the tie-down strap 95 can be moved through the spokes of the front wheel of the bicycle that is received by the tire basket 76 of the stationary front wheel holder 24 (best shown in FIGS. 18-21). The tie-down strap 95 is then detachably coupled to a buckle 96 that is attached to the locking tab 83 from the other one of the tire basket retention rods 80. The tie-down strap 95 reliably holds the front wheel of the bicycle within the tire basket 76 of the stationary front wheel holder 24 so as to prevent the front wheel from falling off the bicycle rack 1.

A similar tie-down strap 97 is coupled to each of the rear wheel holders 13-16 attached to the lower rear wheel support arm 12. The tie-down straps 97 are moved through the spokes of the rear wheels of the bicycles to reliably hold the rear wheels of the bicycle in place within the rear wheel holders 13-16 (best shown in FIGS. 18 and 20).

Returning once again to FIGS. 1 and 2, a downward counter-clockwise rotation of the upper front wheel support 100 in the direction of the reference arrow 126 of FIG. 15 causes a corresponding upward clockwise rotation of the lower rear wheel support arm 12 in the direction of the reference arrow 128 of FIG. 15. As was earlier described, the linking arm 120 is connected between a first coupling pin 122 carried by the lower linking arm support gusset 10 and a second coupling pin 124 carried by the upper linking arm support gusset 6. Thus, the force generated during the downward rotation of the upper front wheel support 100 is transmitted via. the linking arm 120 to cause the lower rear wheel support arm 12 to automatically rotate upwardly to enable the bicycle rack 1 to assume its compact folded configuration of FIG. 16.

In particular, actuating a cam release handle 130 (best shown in FIG. 14) and applying a downward pushing force to the upper front wheel support 100 causes the front wheel support to rotate downwardly with the upper linking arm support gusset 6 around the pivot 7 that runs through the gusset 6 and the top of the upstanding main support bar 3. An opposite upward pulling force is transferred along the linking arm 120 to the lower linking arm support gusset 10 at the coupling pin 122, whereby to cause gusset 10 to rotate in a clockwise direction around the pivot 11 which runs through the gusset 10 and the main support bar 3. The clockwise rotation of the lower linking arm support gusset 10 results in the upward clockwise rotation of the lower rear wheel support arm 12 so as to lie adjacent the main support bar 3 (best shown in FIG. 16).

Rather than having to apply a downward pushing force to the upper front wheel support 100 to fold (i.e., collapse) the bicycle rack 1, an upward force may instead be applied to the lower rear wheel support arm 12. An upward rotation of the rear wheel support arm 12 in the clockwise direction around pivot 10 causes an upward pushing force to be transferred along the linking arm 120 to the upper linking arm support gusset 6 at the coupling pin 124 which runs therethrough. The upward pushing force from linking arm 120 causes the upper front wheel support 100 to automatically rotate with the upper linking arm support gusset 6 downwardly in the counter-clockwise direction around pivot 7.

Thus, as an advantage of the present invention, it can be appreciated that either one of the upper front wheel support 100 or the lower rear wheel support arm 12 may be rotated to cause the other one to automatically rotate as just explained. FIG. 16 shows the bicycle rack 1 in its compact folded configuration after the front wheel support 100 and the rear wheel support arm 12 have been simultaneously rotated so as to lie adjacent the upstanding main support bar 3.

Figure 14:
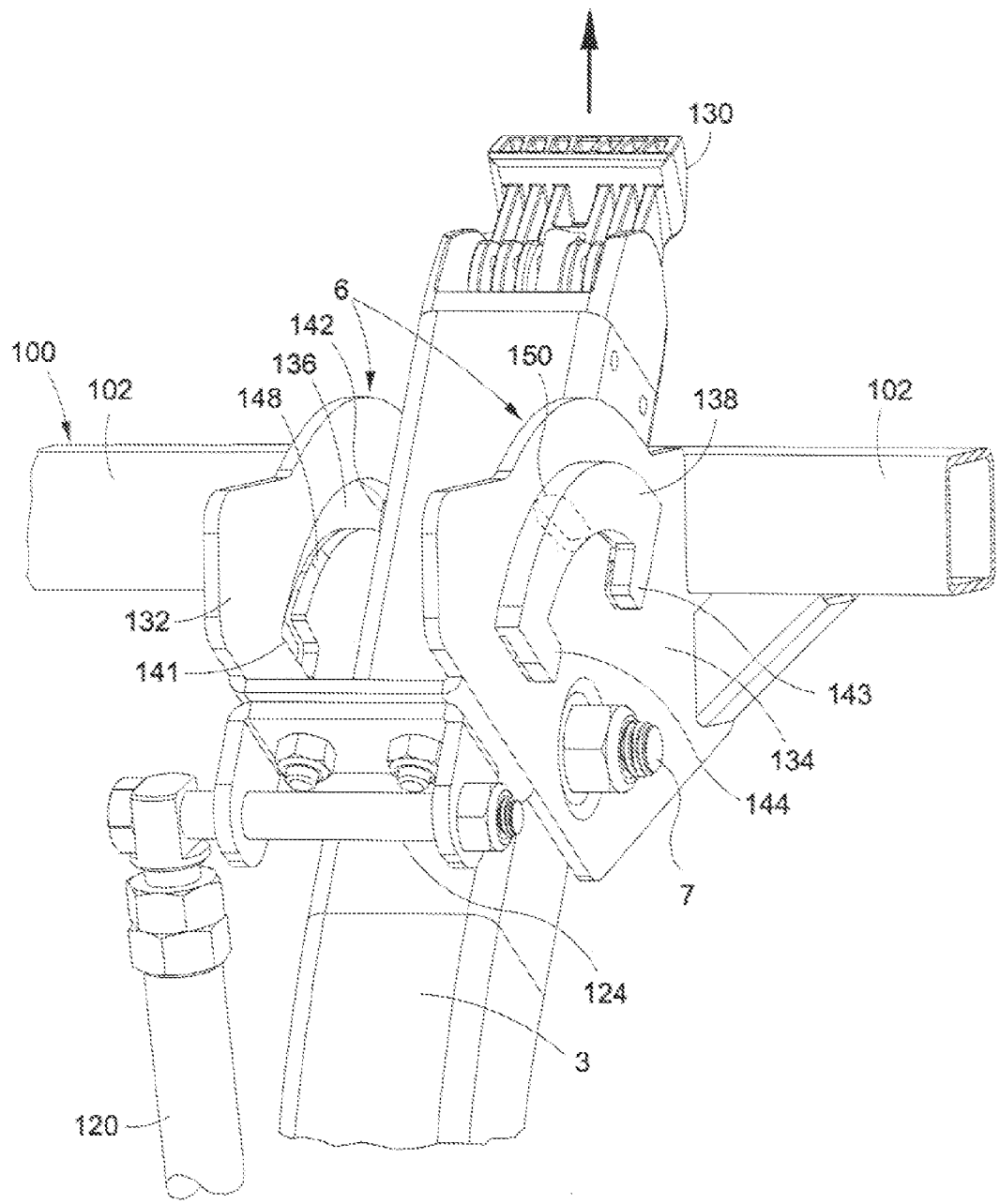
FIG. 14 shows details of an upper linking arm support gusset by which an upper front wheel support which carries opposing pairs of adjustable and stationary front wheel holders is pivotally connected to the top of an upstanding main support bar of the bicycle rack of FIGS. 1 and 2 so that the gusset and the front wheel support can rotate relative to the main support bar.

Details are now provided in FIG. 14 of the drawings of the upper linking arm support gusset 6 from which or to which a pulling or a pushing force is applied from the linking arm 120 to the coupling pin 124 to cause the gusset 6 and the upper front wheel support 100 to rotate around the pivot 7. The upper linking arm support gusset 6 includes a pair of side plates 132 and 134 that are spaced from one another at opposite sides of the main support bar 3. The pivot 7 runs through the gusset side plates 132 and 134 and the top of the main support bar 3 located therebetween so that gusset 6 can rotate relative to support bar 3. As is best shown in FIG. 1, the gusset side plates 132 and 134 are affixed to the rear end 102 of the upper front wheel support 100 so that the gusset 6 and the front wheel support 100 rotate hi unison relative to the main support bar 3.

Each side plate 132 and 134 has a curved track 136 and 138 protruding outwardly therefrom. Locking detents 140, 141 and 143, 144 are formed, at and turn downwardly from first and opposite ends of each of the curved tracks 136 and 138 in side plates 132 and 134. Locking wedges 148 and 150 (shown in phantom lines) ride through the curved tracks 136 and 138 of the gusset side plates 132 and 134 in response to the simultaneous rotation of the upper front wheel support 100 and the upper linking arm support gusset 6 around the pivot 7.

The locking wedges 148 and 150 are biased tor receipt within one of the pairs of locking detents 140 and 143 or 141 and 144 located at opposite ends of each of the curved tracks 136 and 138. With the locking wedges 148 and 150 received within respective locking detents 140 and 143 or 141 and 144, the upper front wheel support 100 will he locked in either its unfolded and outwardly extending position of FIG. 15 or its folded position of FIG. 16 adjacent the upstanding main support bar 3. When the cam release handle 130 is pulled upwardly relative to the main support bar 3, the locking wedges 148 and 150 will he correspondingly pulled upwardly and removed from the locking detents 140 and 143 or 141 and 144 of the curved tracks 136 and 138 in the gusset side plates 132 and 134, whereby to permit the upper front wheel support 100 to be rotated out of the folded or unfolded configuration of the bicycle rack. Inasmuch as the cam release handle 130 and the actuation thereof to control the locking detents 148 and 150 is conventional, no additional details will be provided.

Figure 18:
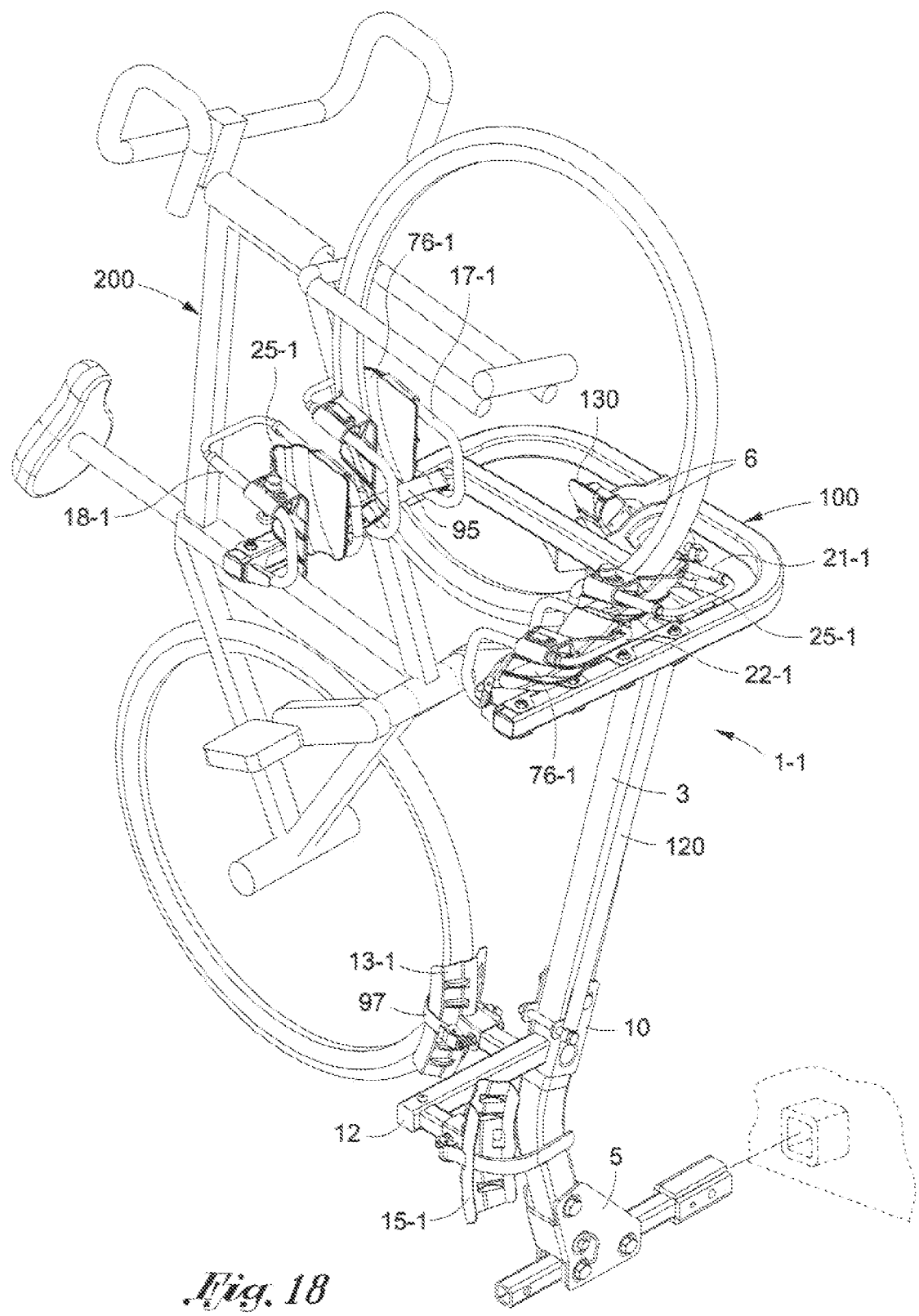
FIGS. 18 and 19 show the modified bicycle rack of FIG. 3 with the front and rear wheels of a single bicycle being engaged and retained by the front and rear wheel holders of the rack so that the bicycle is carried vertically with its front wheel facing up.
Figure 19:
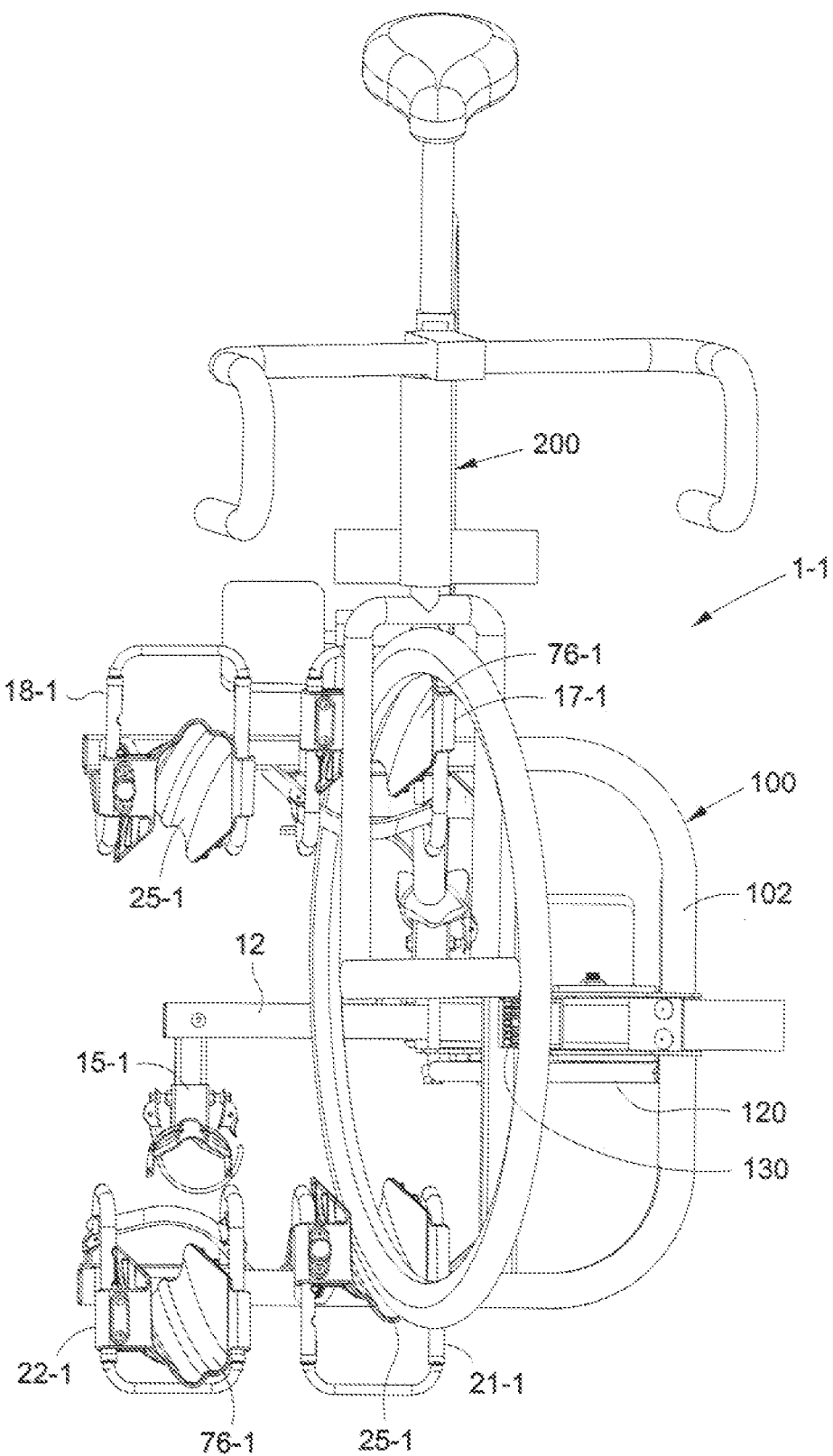
Figure 20:
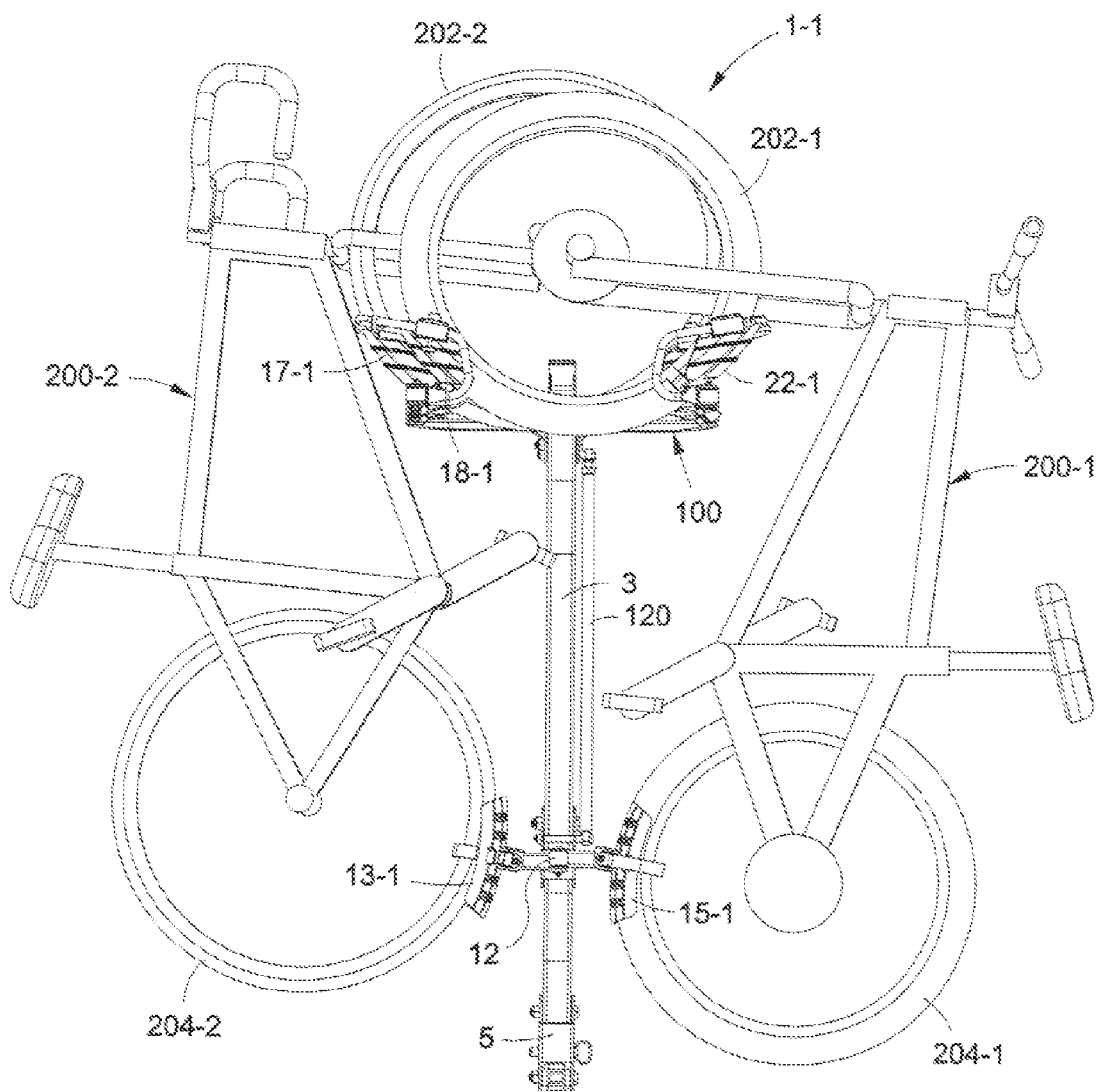
FIGS. 20 and 21 show the modified bicycle rack of FIG. 3 with a pair of bicycles being engaged and retained by the front and rear wheel holders of the rack such that the bicycles are earned vertically and upside down relative to one another so that the front wheels thereof are angled and overlap.
Figure 21:
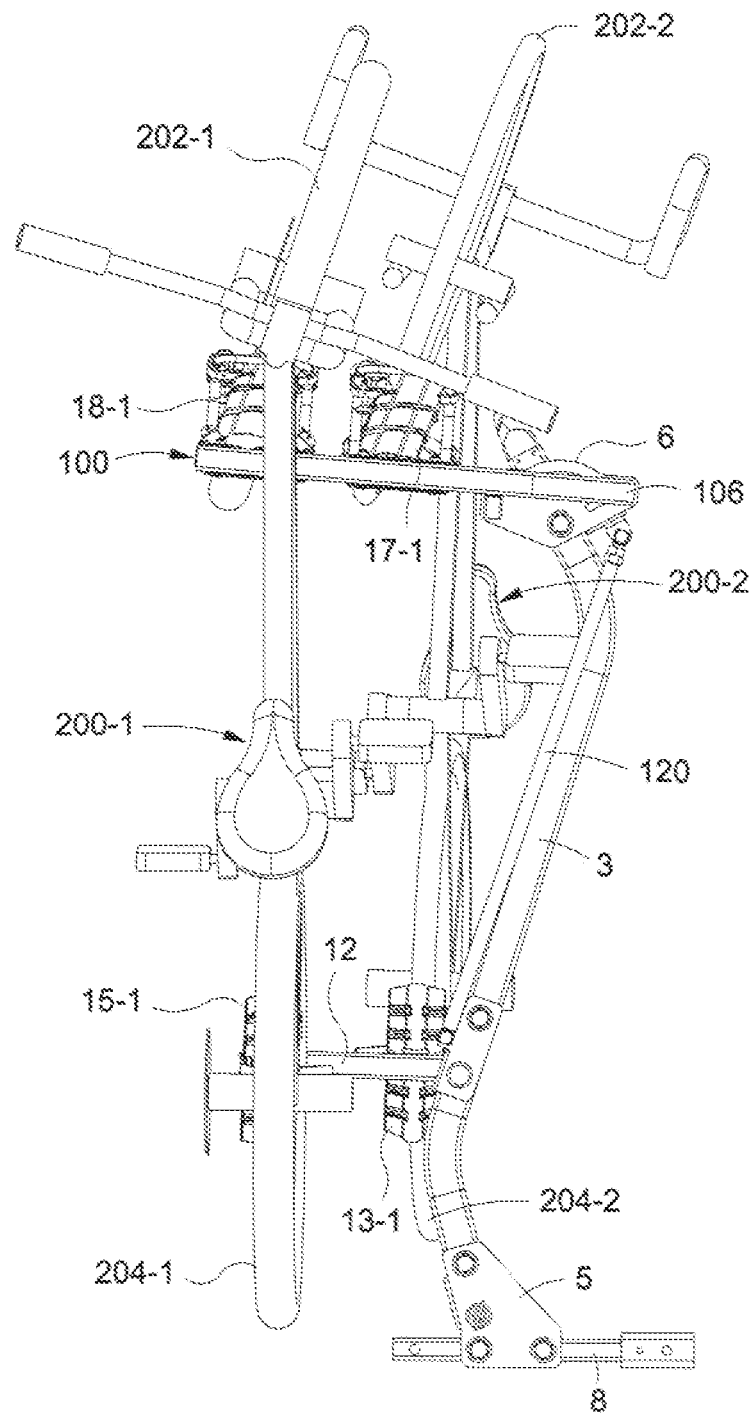

FIGS. 18-21 of the drawings show the bicycle rack 1-1 of FIG. 3 in its unfolded deployed configuration at which to carry a total of two bicycles, with only one bicycle 200 being shown in FIGS. 18 and 19 and a pair of bicycle 200-1 and 200-2 being shown in FIGS. 20 and 21. However, as previously explained, the bicycle rack (designated 1 in FIGS. 1 and 2) may carry a different number (e.g., four) of bicycles. Each bicycle 200, 200-1 and 200-2 being transported is attached to and supported by the bicycle rack 1-1 only at the front and rear wheels, so that all of the bicycles are aligned vertically and parallel to the centerline of the vehicle with their front wheels facing up. By virtue of this vertical alignment damage to the frame, fork and other hard components of the bicycles can be better avoided. In this same regard, and because the rear wheel holders 13-1 and 15-1 connected to the rear wheel support arm 12 face in opposite directions, the pair of bicycles 200-1 and 200-2 of FIGS. 20 and 21 are disposed upside down relative to one another to facilitate the bicycles being loaded from opposite sides of the bicycle rack.

What is more, the tire baskets 25-1 and 76-1 of each opposing pair of adjustable and stationary Font wheel holders 17-1, 21-1 and 18-1, 22-1 carried by the upper front wheel, support 100 of the bicycle rack 1-1 are contoured (best shown in FIG. 19) so that the front wheels 202-1 and 202-2 of the pair of bicycles 200-1 and 200-2 are angled (by about 20 to 25 degrees) relative to the rear wheel 204-1 and 204-2 thereof (best shown in FIG. 21). Thus, the front wheels 202-1 and 202-2 of the bicycles 200-1 and 200-2 will turn towards the rear of the vehicle from which the bicycle rack 1-1 is being transported. Moreover, and as is also best shown in FIG. 21, the front wheels 202-1 and 202-2 are retained in overlapping parallel alignment. However, the contour of the tire baskets 25-1 and 76-1 can be angled in a different direction so that the front wheels of the bicycles turn away from the rear of the vehicle.

The invention claimed is:

1. A bicycle rack to carry at least first and second bicycles, each of said bicycles having front and rear wheels, said bicycle rack comprising:
   a receiver bar adapted to be attached to a hitch at the rear of a motor vehicle;
   a main support bar standing upwardly from said receiver bar;
   an upper front wheel support coupled to and extending from said main support bar, said upper front wheel support having first and second front wheel support bars that are spaced from one another;
   at least first and second adjustable front wheel holders including respective first and second adjustable tire baskets attached to the first front wheel support bar of the upper front wheel support to receive therewithin and support the front wheels of the first and second bicycles at as first location around the circumference thereof;
   at least third and fourth adjustable front wheel holders including respective third and fourth adjustable tire baskets attached to the second front wheel support bar of the upper front wheel support to support the front wheels of the first and second bicycles at a different location around the circumference thereof;
   the first adjustable tire basket attached to the first front wheel support bar of said upper from wheel support lying in opposite facing alignment with and being spaced from the third adjustable tire basket attached to the second front wheel support bar of said upper front wheel support, and the second adjustable tire basket attached to the first front wheel support bar of said upper front wheel support lying in opposite facing alignment with and being spaced from the fourth adjustable tire basket attached to the second front wheel support bar of said upper front wheel support;
   at least one of said opposite facing first or third adjustable tire baskets attached to a corresponding one of said first or second front wheel support bars and being capable of moving towards and away from the other one of said first or third adjustable tire baskets and, at the same time, also being capable of moving towards and away from the other one of said first or second front wheel support bars to thereby adjust the spacing between said first and third adjustable tire baskets in order to receive and support the front wheel of the first bicycle having different diameters;
   wherein said first adjustable front wheel holder also includes a tire basket adjustment channel carried by said first adjustable tire basket and a tire basket adjustment rod located within said tire basket adjustment channel, said tire basket adjustment channel being capable of riding over and moving axially along said tire basket adjustment rod to cause the first adjustable tire basket of said first adjustable front wheel holder to move towards and away from the third adjustable tire basket lying in opposite facing alignment with and spaced from said first adjustable tire basket;
   at least one of said opposite facing second or fourth adjustable tire baskets attached to a corresponding one of said first or second front wheel support bars and being capable of moving towards and away from the other one of said second or fourth adjustable tire baskets and, at the same time, also being capable of moving towards and away from the other one of said first or second front wheel support bars to thereby change the spacing between said second and fourth adjustable tire baskets in order to receive and support the front wheel of the second bicycle having different diameters; and
   a lower rear wheel support coupled to and extending, from said main support bar below said upper front wheel support, said lower rear wheel support having at least first and second rear wheel holders adapted to receive and support the rear wheels of the first and second bicycles.

2. The bicycle rack recited in claim 1, wherein the first rear wheel holder is connected to a first side of said lower rear wheel support, and the second rear wheel holder is connected to the opposite side of said lower rear wheel support such that said first and second rear wheel holders face in opposite directions.

3. The bicycle rack recited in claim 2, wherein the first rear wheel holder connected to the first side of said lower rear wheel support lies closer to said main support bar than the second rear wheel holder connected to the opposite side of said lower rear wheel support.

4. The bicycle rack recited in claim 2, wherein the upper front wheel support is positioned above the lower rear wheel support such that the first and second bicycles carried by said bicycle rack are transported vertically along the upstanding main support bar and parallel to the center line of the motor vehicle with the front wheel of the bicycles facing up.

5. The bicycle rack recited in claim 1, wherein said first adjustable front wheel holder also includes a stop extending between the tire basket adjustment channel and said tire basket adjustment rod located within said channel, said stop preventing said tire basket adjustment channel from riding over and moving axially along said tire basket adjustment rod to correspondingly prevent the first adjustable tire basket of said first adjustable front wheel holder from moving relative to said third adjustable tire basket.

6. The bicycle rack recited in claim 5, wherein said tire basket adjustment rod located within said tire basket adjustment channel has a series of tire basket adjustment depressions formed therein, said stop extending from said tire basket adjustment channel into engagement with said tire basket adjustment rod at one of said series of tire basket adjustment depressions thereof to prevent said tire basket adjustment channel from riding over and along said tire basket adjustment rod.

7. The bicycle rack recited in claim 6, wherein said stop includes a plunger having a position locking barrel, said plunger also having a shaft that extends from the outside to the inside el said tire basket adjustment channel, the shaft of said plunger connected to said position locking barrel to hold said position locking barrel in engagement with said tire basket adjustment rod at the one of said series of tire basket adjustment depressions thereof.

8. The bicycle rack recited in claim 7, wherein, said first adjustable front wheel holder also includes a spring housing and a spring located within said spring housing to communicate with the position locking barrel of said plunger, said spring being expanded within said spring housing to urge said position locking barrel into engagement with said tire basket adjustment rod at the one of said series of tire basket adjustment depressions thereof.

9. The bicycle rack recited in claim 8, wherein the shaft of said plunger is responsive to a pushing force applied thereto at the outside of said tire basket adjustment channel for correspondingly moving the position locking barrel of said plunger out of the one of said series of tire basket adjustment depressions and out of its engagement with said tire basket adjustment rod to permit said tire basket adjustment channel to ride over and along said tire basket adjustment rod so that the position of the first adjustable tire basket of said first adjustable front wheel holder will be adjusted relative to the third adjustable tire basket.

10. The bicycle rack recited in claim 9, wherein the pushing force applied to the shaft of said plunger causes the position locking barrel of said plunger to be moved into said spring housing such that said spring is compressed within said spring housing to store energy, said spring releasing its stored energy and expanding to correspondingly force the locking barrel of said plunger back into engagement with the tire basket adjustment rod at a different one of said series of tire basket depressions after the position of the first adjustable tire basket of said first adjustable front wheel holder has been adjusted and the pulling force applied to the shaft of said plunger has terminated.

11. The bicycle rack recited in claim 1, wherein said upper front wheel support and said lower rear wheel support extending from said upstanding main support bar are rotatable relative to said main support bar so as to lie adjacent one another along said main support bar.

12. The bicycle rack recited in claim 11, further comprising a linking arm pivotally coupled between said upper front wheel support and said lower rear wheel support, such that a rotation of one of said upper front wheel support or said lower rear wheel support in a first direction causes a corresponding and simultaneous rotation of the other one of said upper front wheel support or said lower rear wheel support in an opposite direction.

* * * * *